2,847,183
Patented Aug. 12, 1958

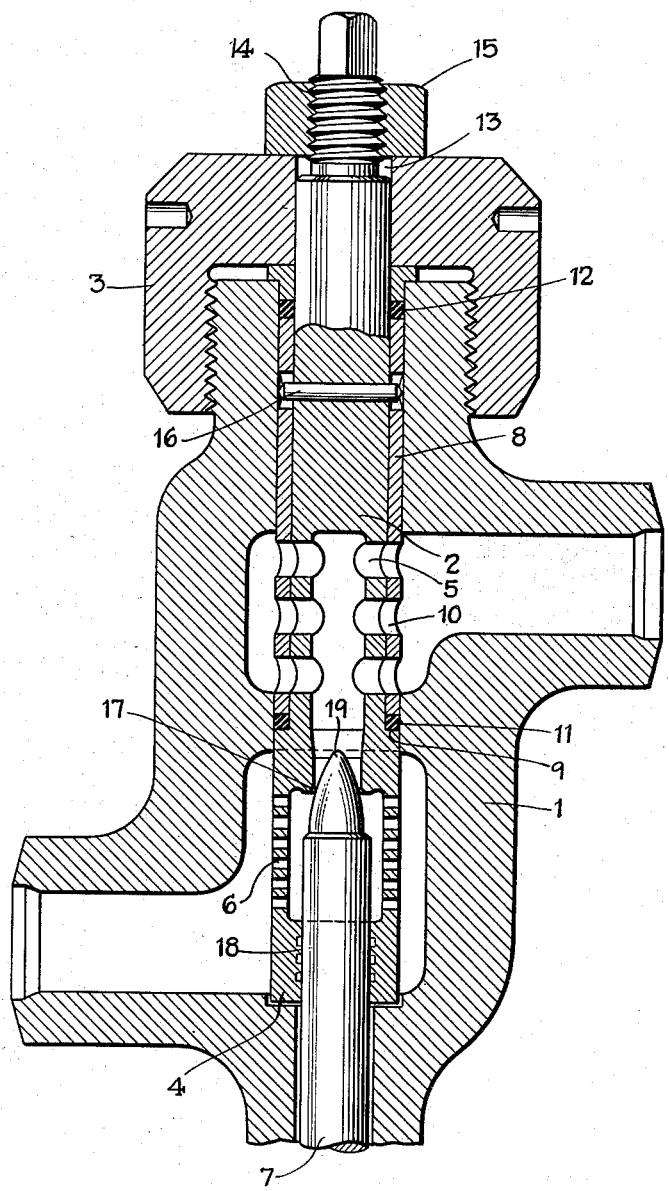

2,847,183

HIGH PRESSURE VALVE

Alfred Buri, Winterthur, Switzerland, assignor to Sulzer Freres, Société Anonyme, Winterthur, Switzerland, a corporation of Switzerland Application November 27, 1953, Serial No. 394,859

Claims priority, application Switzerland December 11, 1952

4 Claims. (Cl. 251—363)

The present invention relates to a high pressure valve, particularly to a high pressure valve having a valve casing containing an interchangeable piston, the valve seat being part of the piston.

According to the invention, a cavity is provided in the front end of the aforesaid piston, the side wall of the hollow front end of the piston being provided with a plurality of openings for admitting and discharging the fluid passing through the valve. The valve seat is preferably arranged at the inside of the wall of the cavity in the front end of the piston between the inlet and the outlet openings for the fluid passing through the valve, a valve member extending into the cavity to abut against the aforesaid seat for closing the fluid passage between the inlet and outlet openings. The portion of the piston which is distal of the valve member is inserted in a sleeve which rests on a shoulder, which is arranged on the outside of the piston and between the aforesaid inlet and outlet openings, the sleeve lining a corresponding bore in the valve casing and being provided with openings for the fluid passing through the valve. Packings are preferably provided at each end of the sleeve between the piston and a bore in the valve casing for the piston and the sleeve. It is of advantage to fix the sleeve in the valve casing by means of a screw cap which cap is provided with a bore affording insertion and withdrawal of the piston. An auxiliary nut may be screwed onto the solid end portion of the piston extending through the bore in the screw cap, the nut resting on the latter and serving for pressing the piston against the sleeve and the latter against the screw cap. Rotation of the piston in the sleeve may be prevented by means of a transverse pin. The valve casing is preferably so constructed that it can be welded to the conduits which are connected by the valve.

The novel features which are considered characteristic of the invention are set forth with particularity in the appended claims. The invention itself, however, and additional objects and advantages thereof will best be understood from the following description of an embodiment thereof when read in connection with the accompanying drawing, the one figure of which illustrates a longitudinal section through a high pressure valve according to the invention.

A preferably cylindrical, stepped piston 2 is arranged in a longitudinal bore of the valve casing 1. The piston can be removed, for example for interchanging it for another piston, after removal of a screw cap 3. The front end 4 of the piston, which is inside the valve casing, is hollow. The piston is substantially as long as the valve casing. The side wall of the hollow front end of the piston is provided with openings 5 and 6 which may have different sizes and configurations, for example bores and slots, and serve for admitting to and discharging the fluid passing through the valve from the cavity in the piston. A valve seat 17 is arranged as an internal annular shoulder in the tubular hollow end portion of the piston between the openings 5 and 6.

A valve member 7 extends through a guide portion 18 in the open front end of the piston 2 into the cavity in the front end portion of the piston and is adapted to abut the seat 17 for closing the connection between the openings 5 and 6. The end portion 19 of the valve member 7 which portion is adapted to abut the seat 17 is preferably in the shape of a cone for producing a throttling or regulating effect when the member 7 is longitudinally moved by conventional means, not shown. The direction of flow of the fluid through the valve is preferably away from the point of the portion 19, but may also be opposite, if desired. The part of the piston 2, which is distal of the valve member, is surrounded by a sleeve 8 which rests against an outside shoulder 9 of the piston 2. This shoulder is placed between the inlet and the outlet openings for the fluid. The sleeve has openings, for example slots 10 corresponding to and being aligned with the openings 5 in the piston when the sleeve is placed on the piston to afford free flow of fluid. Packings 11 and 12 are arranged at the ends of the sleeve for sealing the piston against the bore in the valve casing. A cap 3 screwed on the threaded portion of the casing 1 secures the sleeve 8 in the bore of the valve casing. The interior thread of the cap 3 as well as the exterior thread of the valve casing are subjected to tensioning stress only, so that the individual threads remain in homogeneous abutting relation at unfavorably acting forces. The screw cap 3 has a central bore 13 receiving the solid end of the piston which is provided with a threaded end portion 14 projecting from the cap. An auxiliary nut 15 resting against the cap 3 is screwed on the portion 14 for pulling the piston against the lower end of the sleeve 8 and pretensioning the piston. Pressure is exerted to the packings at the ends of the sleeve 8 upon tightening of the nut 15 for improving the sealing effect of the packings between the piston and the interior of the valve casing. Preferably soft packing material, for example asbestos fibre mixed with graphite powder, is used.

When operation of the valve is started the high pressure fluid compresses the packings 11 and 12 and the piston is correspondingly pushed out of the valve casing through the opening in the screw cap. By tightening the auxiliary nut 15 firm seating of the piston in the valve casing and perfect sealing is restored. Sealing of the interchangeable valve seat forming part of the piston in the valve casing by means of the screw cap 3 and of the packing 12 at the end of the sleeve facing the screw cap is effected in a similar manner as is done by conventional autoclave covers. The packing 11 at the other end of the sleeve is simultaneously compressed. The sealing pressure acting on the packing 11 is also effected by the pressure prevailing in the interior of the valve casing and acting on the parts movable in the valve casing and cooperating with the valve seat. To assure that the openings in the sleeve coincide with the openings in the side wall of the hollow piston portion, the sleeve is secured against rotation relatively to the piston by interlocking means consisting of a sturdy transverse bolt 16 extending through the sleeve and the piston.

The construction of the high pressure valve according to the invention renders it particularly suitable for use as a regulating or throttle valve as well as boiler feed valve, sludge valve, and injection valve. Wear of and damage to the valve seat or leakage caused by frequent operation of the valve can be easily remedied by relatively simple means without taking out the whole valve. The piston including the valve seat together with the sleeve can be easily pulled out of the valve casing by removing the screw cap so that the valve seat can be reground or a new piston can be inserted. A further advantage of the high pressure valve according to the invention resides in the fact that the connecting socket portions of the valve casing can be welded to the pipes connected by the valve. Flange packings are thereby avoided and the possibility of leakages in the pressure pipings is reduced. Valves constructed according to the invention are particularly suitable for use in pipe lines for high temperature and high pressure steam or liquid, for example 300° centigrade and 500 atmospheres. Such valves may have considerable dimensions, the connecting sockets having an interior diameter of 100 mm. and their wall thickness corresponding to the aforesaid pressure and temperature conditions and the piston being about 1 m. long.

What is claimed is:

1. A high pressure valve comprising a casing, a bore in said casing, an inlet cavity communicating with said bore, an outlet cavity communicating with said bore, a sleeve lining said bore, said sleeve having transverse apertures communicating with one of said cavities, a piston within said sleeve and having a solid portion extending outside of said casing, said piston having a hollow portion extending into and communicating with the other of said cavities, said hollow portion of said piston having transverse apertures communicating with said apertures in said sleeve to form a flow passage from one of said cavities through said hollow portion to the other of said cavities, said hollow portion of said piston having an external annular shoulder, said sleeve having an inner end facing said shoulder, a packing interposed between said shoulder and said inner end of said sleeve, closure means coaxial of said bore and screwed onto said casing, said closure means having an annular surface facing the outer end of said sleeve, a packing interposed between said annular surface and the outer end of said sleeve, tightening means for tightening said packings, said tightening means being disposed outside of said closure means and screwed to the solid end of said piston for pressing said shoulder against said sleeve, said hollow portion of said piston having an internal annular shoulder forming a valve seat positioned in said flow passage, and a valve member extending into said hollow portion coaxially of said piston and having a seat portion facing said interior shoulder.

2. A high pressure valve as defined in claim 1, said external shoulder being placed between said internal shoulder and said apertures in said hollow portion of said piston member.

3. A high pressure valve as defined in claim 1 in which said closure means include a screw cap, said solid portion of said piston extending through said cap and having a threaded extension projecting from said cap, said tightening means being in the form of a nut screwed onto said threaded extension and abutting against said cap.

4. A high pressure valve as defined in claim 1, including interlocking means operatively connected with said sleeve and with said piston for defining the relative angular position of said sleeve and of said piston.

References Cited in the file of this patent

UNITED STATES PATENTS

| 841,817 | Ricketts | Jan. 22, 1907 |
| 852,819 | Brick | May 7, 1907 |
| 906,665 | Stevens | Dec. 15, 1908 |
| 916,403 | Adamson | Mar. 30, 1909 |
| 1,547,398 | Jones | July 28, 1925 |
| 1,733,421 | Mauran | Oct. 29, 1929 |
| 1,898,816 | Crossen | Feb. 21, 1933 |
| 2,642,262 | Johnson | June 16, 1953 |
| 2,741,264 | Leonard | Apr. 10, 1956 |